(12) United States Patent
Kasa et al.

(10) Patent No.: US 7,177,326 B2
(45) Date of Patent: Feb. 13, 2007

(54) COMMUNICATION SYSTEM

(75) Inventors: Masamichi Kasa, Fukuoka (JP); Setsuo Abiru, Kawasaki (JP); Toshinori Koyanagi, Kawasaki (JP); Toshiyuki Sakai, Kawasaki (JP); Kazuhiro Uchida, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1005 days.

(21) Appl. No.: 10/062,488

(22) Filed: Feb. 1, 2002

(65) Prior Publication Data
US 2002/0085583 A1    Jul. 4, 2002

Related U.S. Application Data

(63) Continuation of application No. PCT/JP99/04153, filed on Aug. 2, 1999.

(30) Foreign Application Priority Data

Aug. 2, 1999  (WO) ................. PCT/JP99/04153

(51) Int. Cl.
*H04J 3/24*       (2006.01)
(52) U.S. Cl. ................................... 370/474
(58) Field of Classification Search .............. None
See application file for complete search history.

(56) References Cited

U.S. PATENT DOCUMENTS

| 5,600,643 A | 2/1997 | Robrock, II |
| 5,844,906 A | 12/1998 | Khelghatti et al. |
| 5,936,943 A * | 8/1999 | Sakagami et al. ......... 370/244 |
| 6,192,036 B1 * | 2/2001 | Buhler et al. ............... 370/252 |

FOREIGN PATENT DOCUMENTS

| EP | 0 774 848 | 5/1997 |
| JP | 62-146045 | 6/1987 |
| JP | 04-156139 | 5/1992 |
| JP | 11-098151 | 4/1999 |
| WO | WO 99/09689 | 2/1999 |

OTHER PUBLICATIONS

Supplementary Partial European Search Report dated Sep. 26, 2005.

(Continued)

*Primary Examiner*—Doris H. To
*Assistant Examiner*—Robert W. Wilson
(74) *Attorney, Agent, or Firm*—Katten Muchin Rosenman LLP

(57) ABSTRACT

In a communication system comprising a network unit and a plurality of subscriber units connected to the network unit, the network unit generates a message in which validity of transmission grant information is set for the subscriber units, and suspends a transmission of polling information to allocate a transmission grant to the subscriber units by using the transmission grant information for a fixed time in consideration of a processing time of the subscriber units from a time when the message has been completely transmitted. Also, when a disconnection state of an inputted cell from the subscriber units is detected, the network unit may suspend an input disconnection detecting operation for a fixed time from a time when the message and the polling information have been completely transmitted. Furthermore, a switchover of an input disconnection detection/transmission grant information may be suspended by mutually exchanging messages.

18 Claims, 17 Drawing Sheets

OTHER PUBLICATIONS

S. Stojanovski et al. A Block Reservation Approach for Traffic Management over SuperPON. ATM Workshop Proceedings, May 26, 1998, pp. 253-260, XP010280497.

J.D. Angelopoulos, et al. Comparison of traffic control issues between Regular Pons and Superpons. Mediterranean Electrotechnical Conference, vol. 2, May 18, 1998, pp. 769-773, XP010290928.

S. Stojanovski, et al. A Block Reservation Approach for Traffic Management over SuperPON. ATM Workshop Proceedings, May 26, 1998, pp. 253-260 XP010280497.

J.D. Angelopoulos, et al. Comparison of Traffic Control Issues Between Regular Pons and Superpons. Mediterranean Electrotechnical Conference, vol. 2 May 18, 1998, pp. 769-773, XP010290928.

Frans Panken, et al. Investigations on delay and CDV in an ATM-Based optical access network. IEEE ATM Workshop, May 25, 1997, pp. 467-476, XP010247432.

John D. Angelopoulos, et al. A Transparent MAC Method for Badnwidth Sharing and CDV Control at the ATM Layer of Passive Optical Networks. Journal of Lightwave Technology, vol. 14, No. 12, Dec. 1996, pp. 2625-2634, XP000642251.

Massimo Buzzoni, et al. ATM Traffic Management Systems: ASIC Fast Prototyping. Rapid System Prototyping, Jun. 16, 1999, pp. 74-80, XP010343096.

S. Ide et al. V PON Receiver IC with a High-Speed ATC Circuit. High Performance Electron Devices for Microwave and Optoelectronic Applications, Nov. 24, 1997, pp. 141-146, XP010275369.

ITU-T Recommendatio G.983.1—Broadband Optical Access Systems based on Passive Optical Networks (P ON). Series G: Transmission System and Media Digital Systems and Networks, Oct. 1, 1998, pp. 1-118, XP 002145020.

Frans J.M. Panken. A TDMA Based Access Control Scheme for an ATM Passive Optical Tree Network. Broadband Communications, Apr. 23, 1996, pp. 321-332, XP010525732.

Prashant Pradhan, et al. Real-Time Performance Guarantees over Wired/Wireless LANs. Real-Time Technology and Applications Symposium, Jun. 3, 1998, pp. 29-38, XP010287146.

John D. Angelopoulos, et al . TDMA Multiplexing of ATM Cells in a Residential Access SuperPON. IEEE Journal on Selected Areas in Communications, vol. 16, No. 7, Sep. 1998, pp. 1123-1133, XP000785936.

Toshiyuki Sudo, et al. Analysis of ABR Behavior over ATM-Based Broadband Access Networks. IEICE Transactions on Communications, Communication Society, vol. E81-B, No. 2, Feb. 1998, pp. 402-408, XP000778279.

Jong-Won Kim. An Optimized ATM-PON Based FTTH Access Network. Information, Communications and Signal Processing, Sep. 9, 1997, vol. 3, pp. 1800-1804, XP010264117.

International Search Report dated Nov. 2, 1999, for International Application PCT/JP99/04153.

* cited by examiner

▽ : VALID OPTICAL SIGNAL RECEPTION FOR CONCERNED TRANSMISSION GRANT INFORMATION
▼ : VALID OPTICAL SIGNAL NON-RECEPTION FOR CONCERNED TRANSMISSION GRANT INFORMATION

▽ : VALID OPTICAL SIGNAL RECEPTION FOR CONCERNED TRANSMISSION GRANT INFORMATION
▼ : VALID OPTICAL SIGNAL NON-RECEPTION FOR CONCERNED TRANSMISSION GRANT INFORMATION

FIG.21

| | | | |
|---|---|---|---|
| 1 | 00000000 (Header-1) | 28 | GRANT18 |
| 2 | 00000000 (Header-2) | 29 | GRANT19 |
| 3 | 00000000 (Header-3) | 30 | GRANT20 |
| 4 | 00001101 (Header-4) | 31 | GRANT21 |
| 5 | 01110110 (HEC) | 32 | CRC |
| 6 | IDENT | 33 | GRANT22 |
| 7 | SYNC1 | 34 | GRANT23 |
| 8 | SYNC2 | 35 | GRANT24 |
| 9 | GRANT1 | 36 | GRANT25 |
| 10 | GRANT2 | 37 | GRANT26 |
| 11 | GRANT3 | 38 | GRANT27 |
| 12 | GRANT4 | 39 | CRC |
| 13 | GRANT5 | 40 | MESSAGE_PON_ID |
| 14 | GRANT6 | 41 | MESSAGE_ID |
| 15 | GRANT7 | 42 | MESSAGE_FIELD1 |
| 16 | CRC | 43 | MESSAGE_FIELD2 |
| 17 | GRANT8 | 44 | MESSAGE_FIELD3 |
| 18 | GRANT9 | 45 | MESSAGE_FIELD4 |
| 19 | GRANT10 | 46 | MESSAGE_FIELD5 |
| 21 | GRANT11 | 47 | MESSAGE_FIELD6 |
| 2 | GRANT12 | 48 | MESSAGE_FIELD7 |
| 22 | GRANT13 | 49 | MESSAGE_FIELD8 |
| 23 | GRANT14 | 50 | MESSAGE_FIELD9 |
| 24 | CRC | 51 | MESSAGE_FIELD10 |
| 25 | GRANT15 | 52 | CRC |
| 26 | GRANT16 | 53 | BIP |
| 27 | GRANT17 | | |

FIG.22

| 1 | PON-Header1 | 29 | LCF7 |
|---|---|---|---|
| 2 | PON-Header2 | 30 | LCF8 |
| 3 | PON-Header3 | 31 | LCF9 |
| 4 | 00000000 (Header-1) | 32 | LCF10 |
| 5 | 00000000 (Header-2) | 33 | LCF11 |
| 6 | 00000000 (Header-3) | 34 | LCF12 |
| 7 | 00001101 (Header-4) | 35 | LCF13 |
| 8 | 01110110 (HEC) | 36 | LCF14 |
| 9 | IDENT | 37 | LCF15 |
| 10 | MESSAGE_PON_ID | 38 | LCF16 |
| 11 | MESSAGE_ID | 39 | LCF17 |
| 12 | MESSAGE_FIELD1 | 40 | RXCF1 |
| 13 | MESSAGE_FIELD2 | 41 | RXCF2 |
| 14 | MESSAGE_FIELD3 | 42 | RXCF3 |
| 15 | MESSAGE_FIELD4 | 43 | RXCF4 |
| 16 | MESSAGE_FIELD5 | 44 | RXCF5 |
| 17 | MESSAGE_FIELD6 | 45 | RXCF6 |
| 18 | MESSAGE_FIELD7 | 46 | RXCF7 |
| 19 | MESSAGE_FIELD8 | 47 | RXCF8 |
| 21 | MESSAGE_FIELD9 | 48 | RXCF9 |
| 2 | MESSAGE_FIELD10 | 49 | RXCF10 |
| 22 | CRC | 50 | RXCF11 |
| 23 | LCF1 | 51 | RXCF12 |
| 24 | LCF2 | 52 | RXCF13 |
| 25 | LCF3 | 53 | RXCF14 |
| 26 | LCF4 | 54 | RXCF15 |
| 27 | LCF5 | 55 | RXCF16 |
| 28 | LCF6 | 56 | BIP |

FIG.24

| OCTET | CONTENTS | DESCRIPTION |
|---|---|---|
| 40 | MESSAGE_PON_ID | DESTINATION OF MESSAGE (SUBSCRIBER UNIT No. *:00000000-00111111) |
| 41 | MESSAGE_ID | 00001010 |
| 42 | DATA_GRANT | DATA CELL TRANSMISSION GRANT INFORMATION (00000000-11111100) |
| 43 | 0000000a | a=1:VALIDATE ABOVE DATA CELL TRANSMISSION GRANT INFORMATION (VALIDITY)<br>a=0:INVALIDATE ABOVE DATA CELL TRANSMISSION GRANT INFORMATION (INVALIDITY) |
| 44 | PLOAM_GRANT | PLOAM CELL TRANSMISSION GRANT INFORMATION (00000000-11111100) |
| 45 | 0000000a | a=1:VALIDATE ABOVE PLOAM CELL TRANSMISSION GRANT INFORMATION (VALIDITY)<br>a=0:INVALIDATE ABOVE PLOAM CELL TRANSMISSION GRANT INFORMATION (INVALIDITY) |
| 46..51 | — | — |

FIG.25

| OCTET | CONTENTS | DESCRIPTION |
|---|---|---|
| 40 | MESSAGE_PON_ID | DESTINATION OF MESSAGE (SUBSCRIBER UNIT NO. *:00000000-00111111) |
| 41 | MESSAGE_ID | 00001011 |
| 42 | 0000000a | a=1:VALIDATE FOLLOWING MINI CELL TRANSMISSION GRANT INFORMATION (VALIDITY)<br>a=0:INVALIDATE FOLLOWING MINI CELL TRANSMISSION GRANT INFORMATION (INVALIDITY) |
| 43 | DIVIDED_SLOT_GRANT | MINI CELL TRANSMISSION GRANT INFORMATION (00000000-11111100) |
| 44 | LENGTH | PAYLOAD LENGTH OF MINI CELL TRANSMITTED TO ABOVE MINI CELL TRANSMISSION GRANT INFORMATION |
| 45 | OFFSET | HEAD POSITION OF MINI CELL TRANSMITTED TO ABOVE MINI CELL TRANSMISSION GRANT INFORMATION |
| 46 | Service_ID | SERVICE ID |
| 47..51 | — | — |

N : HEAD POSITION
L : PAYLOAD LENGTH

COMMUNICATION SYSTEM

This application is a continuation of international application number PCTJP99/04153, filed Aug. 2, 1999.

BACKGROUND OF THE INVENTION

1. Field of the Invention

The present invention relates to a communication system in which a plurality of subscriber units (ONU's) are connected to a network unit (OLT) through a common medium and the subscriber units transmit information by polling information from the network unit such as an ATM-PON, and in particular to an allocation control of transmission grant information used for the polling information.

2. Description of the Related Art

1. Frame Structure of ATM-PON

The specification of an ATM-PON system is prescribed by the ITU-T recommendation G.983.1 at present. FIG. 20 shows a frame structure in an ATM-PON transmission system prescribed by the G.983.1. A single frame is composed of 23744 bits at 155.52 Mb/s in both of a down direction from a network unit (OLT) to a subscriber unit (ONU) and an up direction from the subscriber unit to the network unit.

In the down direction, 53-byte cells are transmitted in series. Two transmission rates of 155.52 Mb/s and 622.08 Mb/s are prescribed, so that 56 cells compose a single frame for the 155.52 Mb/s and 224 cells compose the same for the 622.08 Mb/s. On the other hand, the up direction adopts a transmission system where a plurality of subscriber units intermittently transmit 56-byte cells. The transmission rate is 155.52 Mb/s only, so that 53 slots of 56-byte length-time slots compose a single virtual frame.

The cells in the down direction are broadly divided into physical layer OAM (hereinafter, referred to as PLOAM) cells and ATM cells. The PLOAM cell is always transmitted at the head of a block when a frame is divided into 28-cell blocks (2 blocks for 155.52 Mb/s, and 8 blocks for 622.08 Mb/s). FIG. 21 shows a structure of a PLOAM cell transmitted in the down direction.

On the other hand, the cells in the up direction include a cell (mini cell) shorter than a 53-byte cell in addition to the two kinds of the down cells. This mini cell is transmitted by a slot (Divided_slot) obtained by further dividing a 56-byte time slot into plural slots. Which subscriber unit transmits a cell, which cell is transmitted, and to which time slot the cell is transmitted are designated by the network unit with a method described later. FIG. 22 shows the structure of an up direction PLOAM cell.

2. Transmission Control of up Direction Cell

Hereinafter, a designation method for the above-mentioned up direction cell transmission will be described.

Firstly, in order for the subscriber unit to transmit the cell, the network unit is required to allocate a number for each cell transmission grant. This transmission grant number (grant) is prescribed as ATM cell transmission grant information (Data grant), PLOAM cell transmission grant information (PLOAM grant), or mini cell transmission grant information (Divided_slot grant), according to the classification of the cell.

The cell transmission grant information and the PLOAM cell transmission grant information are individually allocated to each of the network units, and the mini cell transmission grant information is individually allocated to each group composed of plural network units, respectively without being mutually superimposed. The allocated information is notified to the concerned subscriber unit by a message.

It is to be noted that the "message" is control information or the like between the network unit and the subscriber unit, and is transmitted by the PLOAM cell. The region of "MESSAGE_**" within each PLOAM cell is a region for transmitting an up/down message, and a message for a transmission grant notification is also prescribed within the down message.

As a message for notifying the allocation of the data cell transmission grant information and the PLOAM cell transmission grant information, a transmission grant allocation (Grant_allocation) message is prescribed; As a message for notifying the allocation of the mini cell transmission grant information, a transmission grant setting (Divided_slot_grant_configuration) message is prescribed; Those messages will be described later. As for the mini cell transmission grant information, various setting information (payload length, transmission start position, and service ID) of a mini cell transmitted to the mini cell transmission grant information is also notified to the subscriber unit.

If the transmission grant information is allocated to each of the subscriber units, an actual designation of a cell transmission is performed in a region of a "GRANT**" in the PLOAM cell.

The region "GRANT", as shown in FIG. 23, corresponds to each of the time slots of the up frame depending on how manieth PLOAM cell it is in the down frame. Regardless of the down transmission rate, the regions from the first region GRANT1 of the head PLOAM cell to the region GRANT26 of the second PLOAM cell in the down frame are sequentially designated to the time slots of the up frame from the head time slot. The network unit writes various transmission grant information in each region GRANT to be notified to each subscriber unit, while the subscriber unit transmits various cells to the corresponding position of the up slot when finding the transmission grant information notified by the above-mentioned message in the region.

3. Message used for Allocating Transmission Grant Information

A message conveys controlling information or the like between the network unit and the subscriber unit, and is transmitted in the region indicated by MESSAGE_** of the up and the down PLOAM cells. Various messages are prescribed for the up/down cells respectively. Among these messages, the following transmission grant allocation message and a mini cell transmission grant setting message are prescribed in the down direction message as is used for allocating the transmission grant information.

4. Transmission Grant Allocation Message (See FIG. 24).

This message serves to notify the codes of the data cell transmission grant information and the PLOAM cell transmission grant information, and their validity/invalidity (activation/deactivation) settings to the subscriber unit.

Upon granting the transmission of the above-mentioned cell to the subscriber unit, the network unit firstly notifies, by this message, the code of the transmission grant information and that it is valid (active).

The subscriber unit processes the message if its destination is the subscriber unit itself, and performs setting the number to which the subscriber unit itself should transmit the PLOAM cell or ATM cell otherwise if the information is valid. If the information is invalid (deactive), the subscriber unit stops the cell transmission with respect to the number.

At present, the message is not prescribed to perform a processing in an operation state, in which an allocation and a validity/invalidity switchover are not prescribed.

5. Mini Cell Transmission Grant Setting Message (See FIG. 25)

This message notifies the number of the mini cell transmission grant information, and the validity/invalidity thereof, as well as the information related to the position and the length to the subscriber units.

The subscriber units performs the same validity/invalidity processing as the transmission grant allocation message (see FIG. 24) to the notified mini cell transmission grant information if the destination is the subscriber unit itself. Also, as for this transmission grant information, the subscriber unit sets/releases the payload length, an offset value, a service ID of the mini cell transmitted to the transmission grant information.

FIG. 26 shows a relationship between a payload length (LENGTH), a head position (OFFSET), and an up time slot (Divided_slot). At present, the allocation of the mini cell transmission grant information is not prescribed in detail.

FIG. 27 shows a basic arrangement of the prior art communication system by the above-mentioned ATM-PON transmission system.

In the network unit OLT, a transmission grant information manager manages various transmission grant information and setting of validity/invalidity on the subscriber units ONU's one-on-one, and manages the payload length of the cell of the subscriber unit ONU top which the mini cell transmission grant information is allocated, an offset value indicating the position in the slot, and a service ID as for the mini cell transmission grant information.

When changing the setting, a message generator 2 generates a message by which the setting change is notified to the subscriber unit ONU prescribed times (three times) according to the request from the transmission grant information manager 1.

A polling information generator 3 generates polling information by using transmission grant information set as being "valid" in the transmission grant information manager 1, and notifies the generated polling information to an input disconnection detector 4.

The generated massage and polling information are mapped into the PLOAM cell inserted at 28-cell intervals by a multiplexer 5 to be transmitted to the subscriber unit ONU.

The input disconnection detector 4, based on the information generated at the polling information generator 3, manages a source subscriber unit ONU of an arriving cell, monitors the input of the cell for every subscriber unit ONU, and detects an input disconnection state (LOSi) in the absence of an 8-time continuous valid input for the subscriber unit ONU.

An identifier 6 identifies a received cell according to a transmission grant information classification for each subscriber unit to be processed.

In the subscriber unit ONU, a message processor 21 acquires the various transmission grant information form the PLOAM cell extracted at the PLOAM cell demultiplexer 22, and sets the validity/invalidity thereof. As for the mini cell transmission grant information, the message processor 21 further extracts the payload length and the offset value.

A transmission grant information manager 23 manages the various transmission grant information one-on-one in accordance with the setting contents extracted by the message processor 21. As for the mini cell transmission grant information, the transmission grant information manager 23 also manages the various setting information (payload length, offset, service ID).

A polling information extractor 24 monitors the polling information transmitted by the PLOAM cell. When the various transmission grant information set valid is extracted at the transmission grant information manager 23, the polling information extractor 24 notifies a multiplexer 25 of the up information, the PLOAM cell, or the transmission phase of the mini slot if the transmission grant information is the cell transmission grant information, the PLOAM cell transmission grant information, or the mini cell transmission grant information, respectively.

The multiplexer 25 transmits various cells depending on the kind of cell and the transmission phase to be transmitted from the polling information extractor 24. When the PLOAM cell is transmitted, the message generated at a massage generator 26 is mapped.

In such a prior art communication system mentioned above, the present G.983.1 only prescribes that the subscriber unit processes all of the messages within a term of 6 frames at the maximum. This similarly applies to the above two messages. The subscriber unit may start (if valid; or stop if invalid) the transmission of the cell to the transmission grant information at any time if only within the term of 6 frames after receiving the messages.

Since the network unit can not recognize this timing, it starts the polling just after the message transmission by using the transmission grant information. The subscriber unit does not transmit the cell with respect to the polling before the processing is completed in the subscriber unit.

Furthermore, when no valid cell is inputted with respect to the polling prescribed times (8 times) continuously in the G.983.1, it is found to be the input disconnection state (LOSi), so that the processing is performed to make the corresponding subscriber unit the non-operation state. Therefore, if the subscriber unit satisfying the prescription has no consideration therefor, the non-operation processing is performed with the worst timing.

Also, if this point is not considered even in the startup, a cell is not transmitted in response to the transmission request of the cell, whereby the subscriber unit fails to start up successfully.

Also, as for the mini cell transmission grant information, a single transmission grant information is used for a group. Therefore, when a certain subscriber unit is not found valid/invalid, there are some cases where polling information by the transmission grant information is generated to the other subscriber unit in which the transmission grant information is valid, and there is a possibility that the input disconnection state is similarly detected.

Inherently, this is not a proper input disconnection detection. Also, upon the detection of the input disconnection state, the network unit performs a processing of making the subscriber unit the non-operation state when it is in the operation state. Therefore, some control is required for this processing.

Also, control is required for the case where a plurality of allocations are performed to the same kind of transmission grant information or different settings are instructed to the same transmission grant information as for the mini cell transmission grant information.

SUMMARY OF THE INVENTION

It is accordingly an object of the present invention to provide a communication system in which a plurality of subscriber units are connected to a network unit, which avoids the worst polling in the network unit, and which does not make a normal subscriber unit an object of a non-operation processing even upon an input disconnection detection by the worst polling.

In order to achieve the above-mentioned object, in the invention of claim 1, the network unit has means for generating a message in which validity of transmission grant information is set for the subscriber units, means for generating polling information to allocate a transmission grant to the subscriber units by using the transmission grant information, and means for suspending a transmission of the polling information for a fixed time in consideration of a processing time of the subscriber units from a time when the message has been completely transmitted.

Namely, after transmitting a message to each of the subscriber units, the network unit stops the transmission of polling information to 130 allocate a transmission grant by transmission grant information during a period of the validity/invalidity of the transmission grant information included in the message being undetermined (during a period of the processing of the subscriber unit being estimated to be completed), and avoids the execution of an input disconnection state (LOST) detecting of the subscriber unit. Thus, a malfunction of the making the subscriber unit non-operation state can be avoided.

In the invention of claim 2, the network unit has means for generating a message in which validity of transmission grant information is set for the subscriber units, means for generating polling information to allocate a transmission grant to the subscriber units by using the transmission grant information, input disconnection detecting means for detecting a disconnection state of an inputted cell from the subscriber units, and input disconnection detecting switchover controlling means for suspending an input disconnection detecting operation for the transmission grant information of the input disconnection detecting means for a fixed time in consideration of a processing time of the subscriber units from a time when the message and the polling information have been completely transmitted.

Namely, the network unit transmits the above-mentioned polling information in addition to the above-mentioned message to each of the subscriber units, and stops the input disconnection detection itself of the inputted cell for the allocation of the transmission grant by the polling information during a fixed period of the validity/invalidity of the transmission grant information in the subscriber unit being undetermined, instead of stopping the polling as in the invention of claim 1. Thus, a wrong input disconnection detection for the subscriber unit can be avoided.

In the invention of claim 3, the network unit has means for generating a message in which validity of transmission grant information is set for the subscriber units, means for generating polling information to allocate a transmission grant to the subscriber units by using the transmission grant information, input disconnection detecting means for detecting a disconnection state of an inputted cell from the subscriber units, and input disconnection detecting switchover controlling means for monitoring a detection result of the input disconnection detecting means from a time when the message and the polling information have been completely transmitted and for validating/invalidating a function for the transmission grant information of the input disconnection detecting means after respectively detecting/not detecting an inputted cell of validity/invalidity for the transmission grant information.

Namely, the network unit switches over the execution/non-execution of the subsequent input disconnection detection based on the presence/absence (detection/non-detection) of the inputted cell for the polling information by the transmission grant information, instead of suspending the processing completion for the validity/invalidity of the transmission grant information in the subscriber unit for a fixed time as in the invention of claim 2.

It is to be noted that a timer may be used to suspend the switchover for a fixed time after the validity/invalidity of the input disconnection detection is switched over in the invention of claim 3 as in the invention of claim 4.

In the invention of claim 5, the subscriber units have means for recognizing a setting of validity/invalidity of transmission grant information in a message form the network unit, and means for transmitting a message to the network unit when recognizing the setting of the validity/invalidity from the message, and the network unit has means for generating the message, input disconnection detecting means for detecting a disconnection state of an inputted cell, and means for validating/invalidating the input disconnection detecting means when receiving a message from the subscriber units.

Namely, the processing completion of the subscriber unit is not determined only by the network unit as mentioned above, but a message is notified form the network unit to the subscriber unit, so that the subscriber unit switches over the validity/invalidity of the input disconnection detection by the reception of the message.

In the invention of claim 6, the network unit has means for managing plural kinds of transmission grant information, means for performing a polling by the transmission grant information, means for detecting transmission grant information coincident with the transmission grant information set from polling information of a same subscriber unit received by the polling, and subscriber unit identifying means for identifying a kind of transmission grant information based on the detected transmission grant information and for distributing an inputted cell.

Namely, for a control when a plurality of codes are allocated to the same kind of transmission grant information, identifying means corresponding to the subscriber unit are provided in the network unit, and the cells received from the same subscriber unit for the same kind of plural transmission grant information are identified, distributed, and outputted.

In the invention of claim 7, the network unit has means for managing a plural kinds of transmission grant information set in a message, means for notifying a switchover of the validity/invalidity of the transmission grant information to the subscriber units by a message, and means for executing the switchover of the transmission grant information within the network unit itself after a fixed time in consideration of a processing time of the subscriber units from a time of the notification, and the subscriber units have means for executing the switchover of the transmission grant information within the subscriber units themselves after the fixed time form the reception of the message.

Namely, for switchover between the cases where plural codes are allocated to the same kind of transmission grant information, the network unit generates a timing for switching over to be notified to the subscriber unit by a message. However, in the present invention, after a fixed time in consideration of a processing time of the subscriber unit, the network unit and the subscriber unit execute respective switchovers.

Thus, the network unit can recognize the switchover timing of the subscriber unit and perform a switchover.

In the invention of claim 8, the subscriber units have means for recognizing a switchover of validity/invalidity of plural kinds of transmission grant information set in a message, and means for transmitting a message to the network unit when recognizing the switchover by a message from the network unit, and the network unit has input disconnection detecting means for detecting a disconnection state of an inputted-cell, and means for executing the switchover of the transmission grant information within the network unit itself when receiving a message form the subscriber units and for validating/invalidating the input disconnection detecting means.

Namely, for switchover between the cases where two codes are allocated to the same kind of transmission grant information, in the same way as the invention of claim 7, a timing of switching over the transmission grant information is notified by a message from the network unit to the subscriber unit. However, in this invention, the timing of switching over is returned to the network unit by the message from the side of the subscriber unit having received the message, so that the network unit recognizes the switchover timing of the subscriber unit to perform the switchover.

In the invention of claim 9, the network unit has means for managing a plural kinds of mini cell transmission grant information set in a message, means for notifying a switchover of the validity/invalidity of the mini cell transmission grant information to the subscriber units by the message, and means for executing the switchover of the validity/invalidity of the mini cell transmission grant information within the network unit itself after a fixed time in consideration of a processing time of the subscriber units from a time of the notification and the subscriber units have means for executing the switchover of the mini cell transmission grant information within the subscriber units themselves after the fixed time from reception of a message Namely, for switchover between the cases where different setting contents (payload length, offset value, and service ID) are allocated to the same number in the mini cell transmission grant information, in the same way as the invention of claim 8, the network unit generates a timing of switching over to be notified to the subscriber unit by a message. The network unit and the subscriber unit respectively switch over the setting after a lapse of the above-mentioned fixed time, thereby recognizing the switchover timing of the subscriber unit in the network unit to be switched.

In the invention of claim 10, the subscriber units have means for recognizing plural mini cell transmission grant information set in a message, and means for transmitting a message to the network unit when recognizing a switchover of the setting by a message form the network unit, and the network unit has input disconnection detecting means for detecting a disconnection state of an inputted cell, and means for executing the switchover of the setting of the min cell transmission grant information within the network unit itself when receiving a message form the subscriber units and for validating/invalidating the input disconnection detecting means.

Namely, for switchover between the cases where the different setting contents (payload length, offset value, and service ID) are allocated to the same number in the mini cell transmission grant information, in the same way as the invention of claim 7, switchover timing is notified by a message from the network unit to the subscriber unit, and is further notified from the subscriber unit to the network unit, thereby enabling the network unit and the subscriber unit to perform a switchover in synchronization with each other.

It is to be noted that by the invention of claim 11 the transmission grant information may include physical layer OAM cell transmission grant information and data cell transmission grant information.

BRIEF DESCRIPTION OF THE DRAWINGS

F*ig*. 7. is a block diagram showing an arrangement of an embodiment (4) of a communication system according to the present invention

Figure 11:
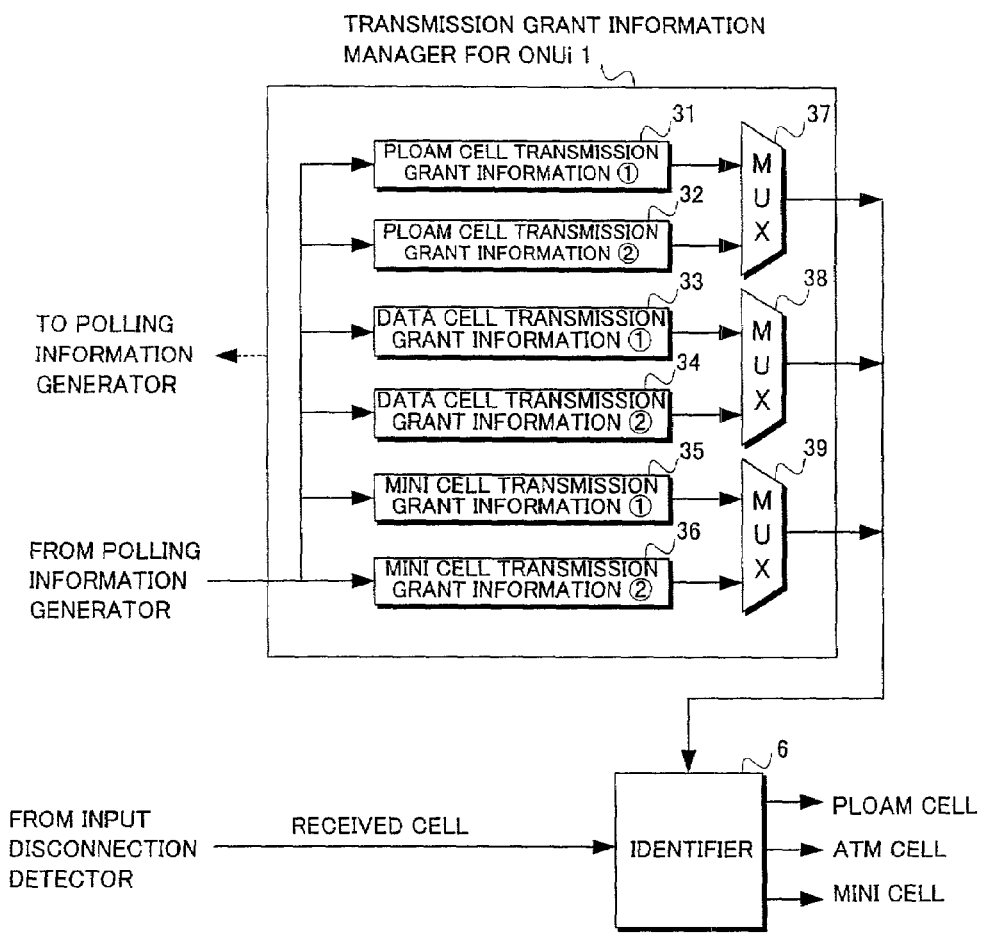
Figure 12:
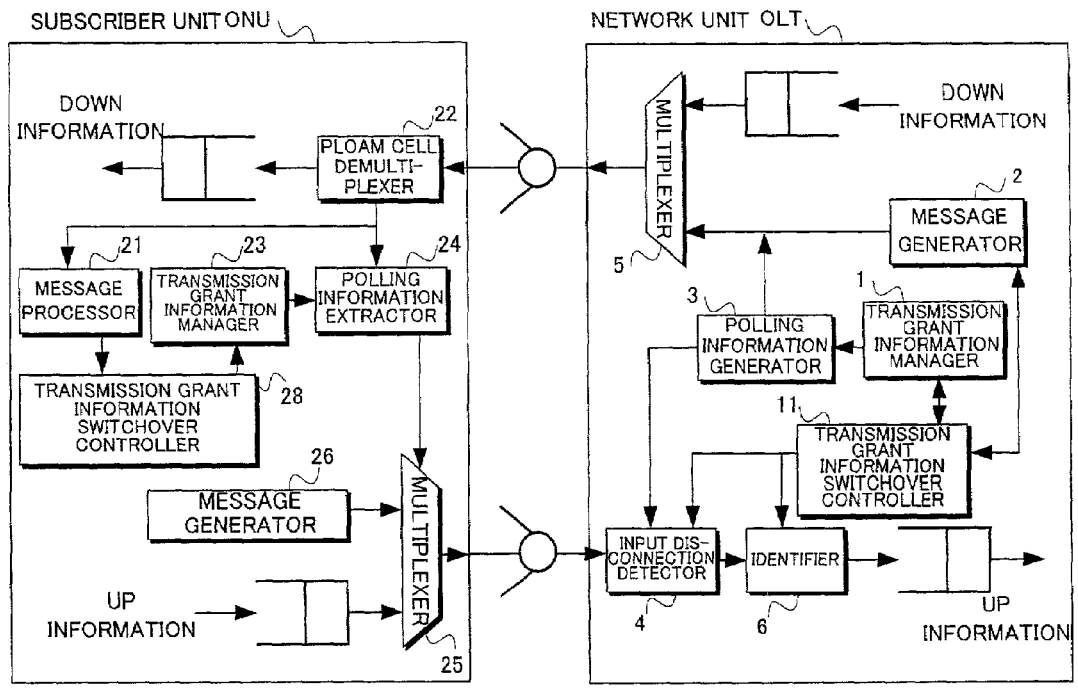
Figure 13:
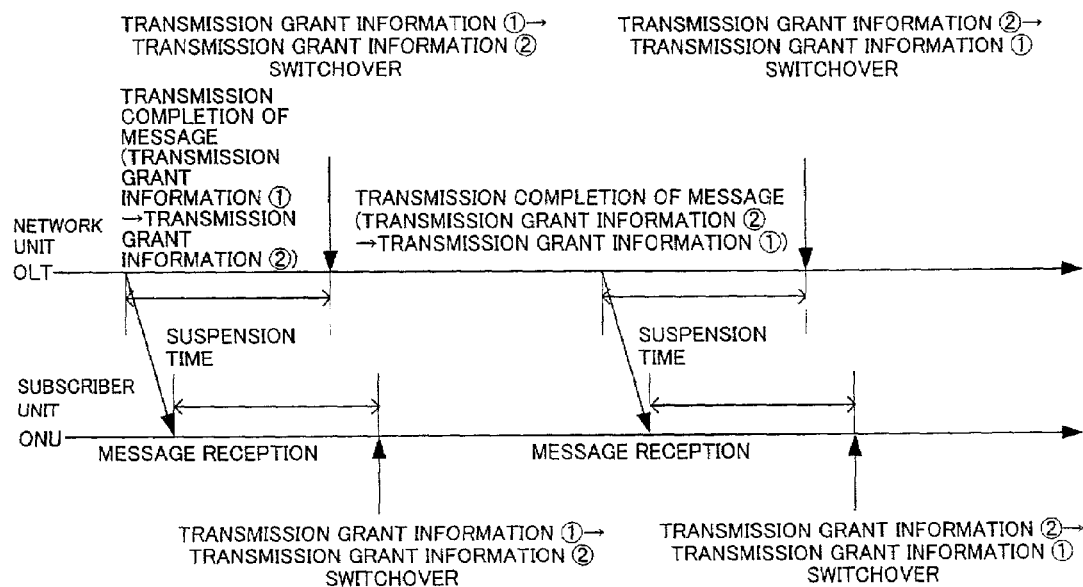
Figure 14:
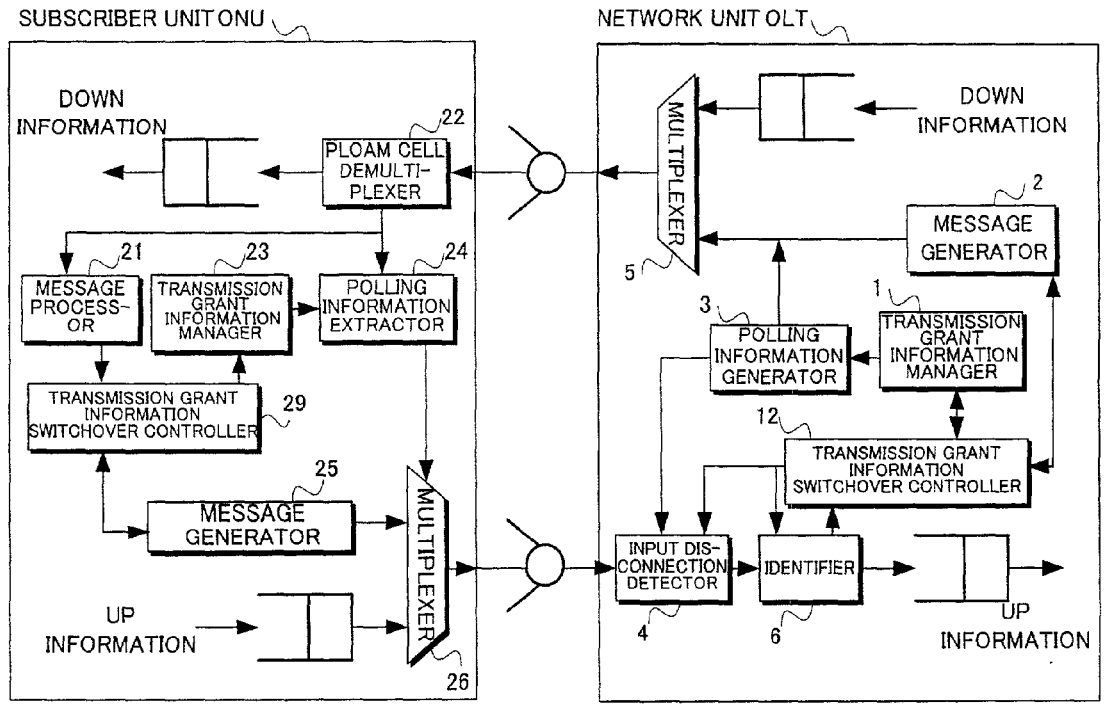
Figure 15:
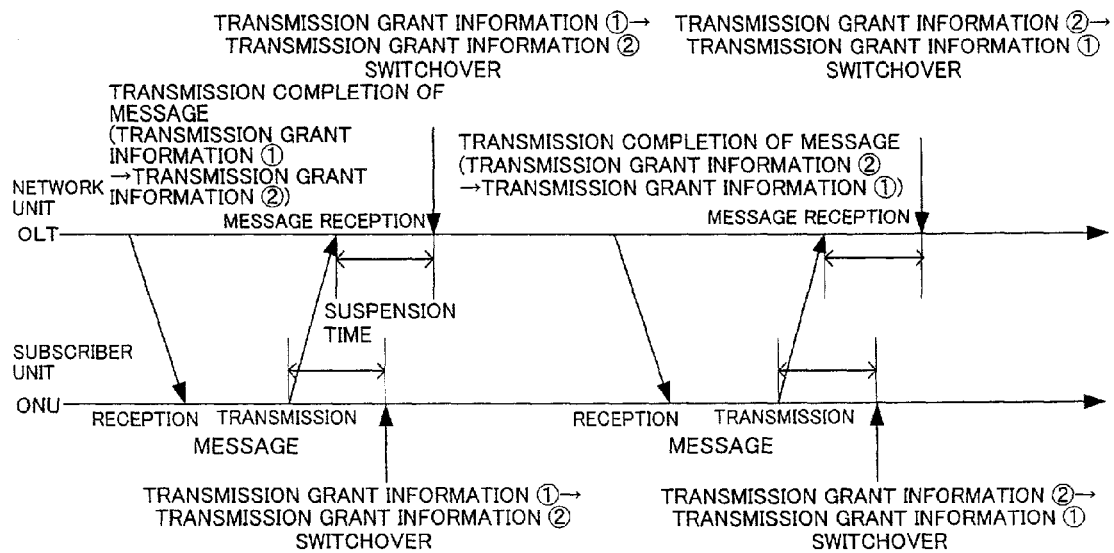
Figure 16:
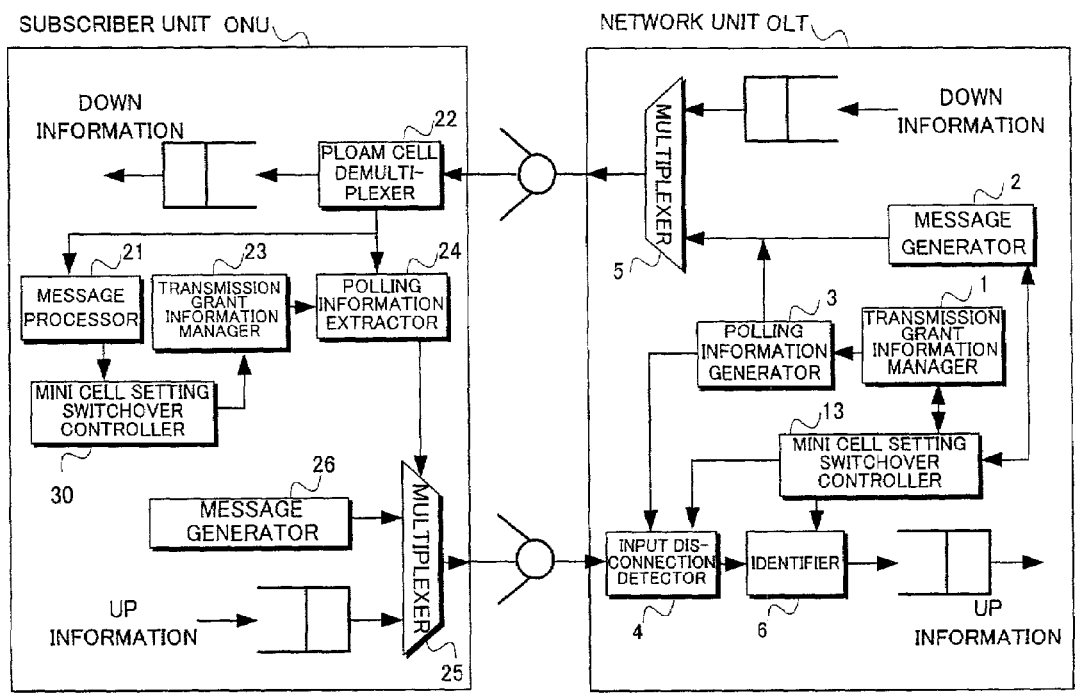
Figure 17:
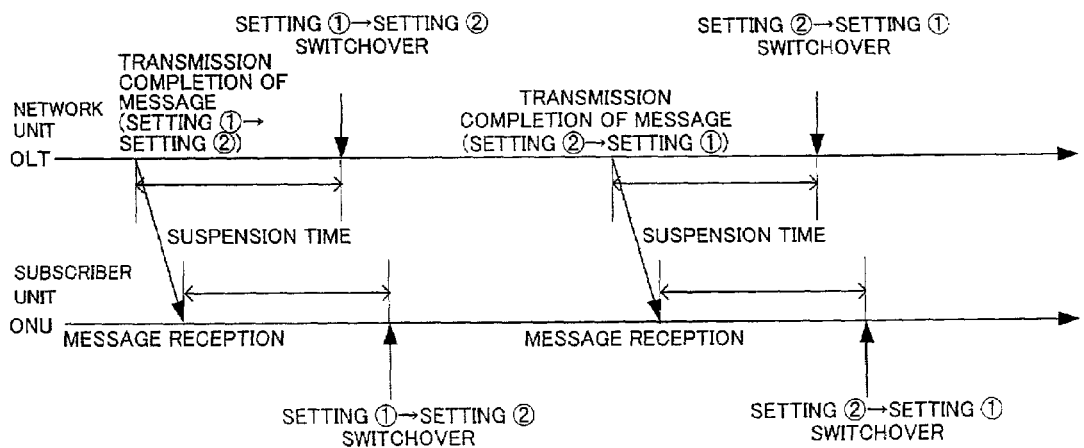
Figure 18:
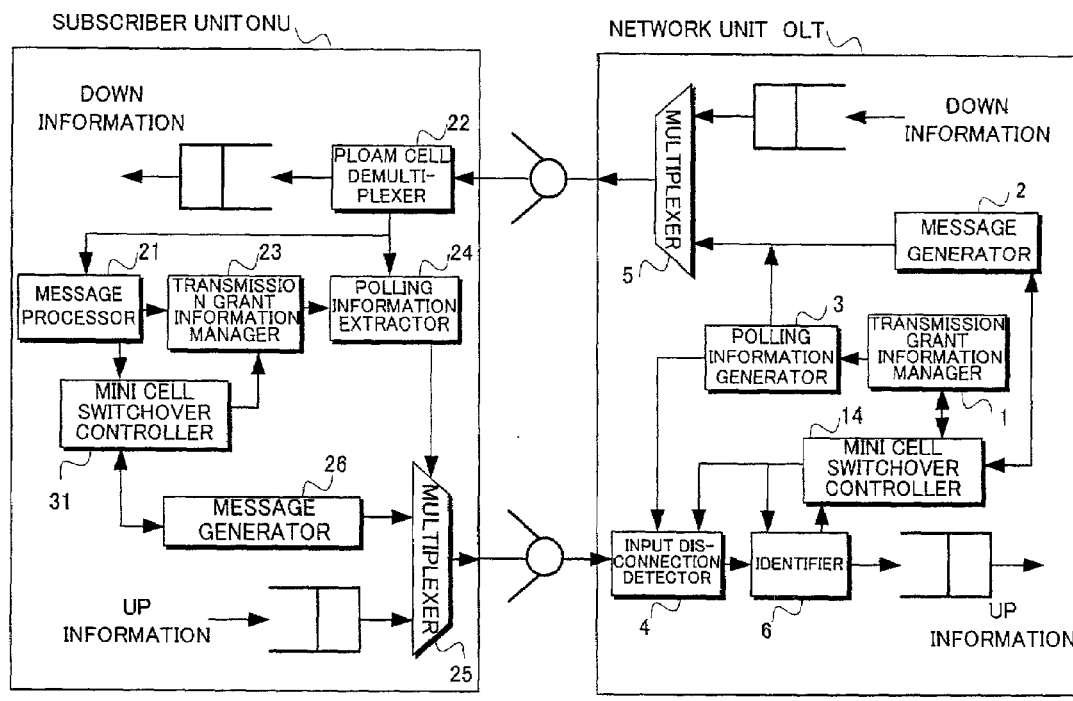
Figure 19:
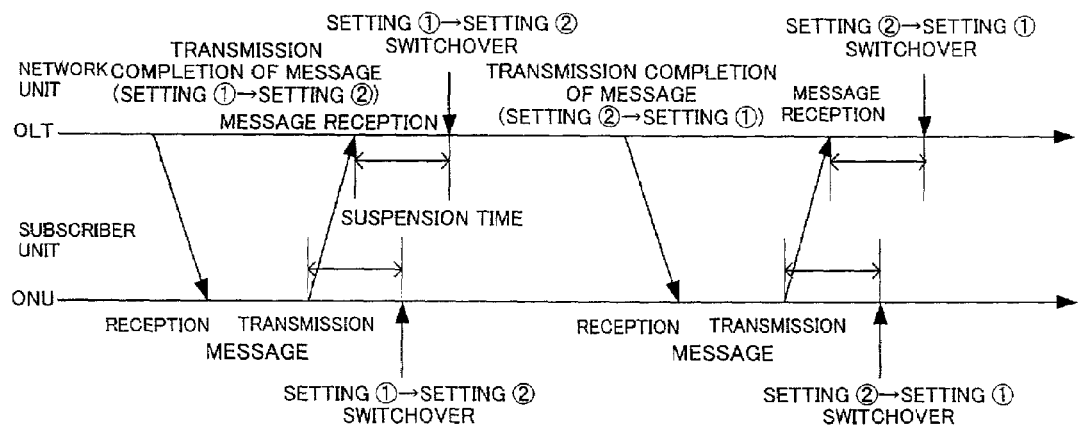
Figure 20:
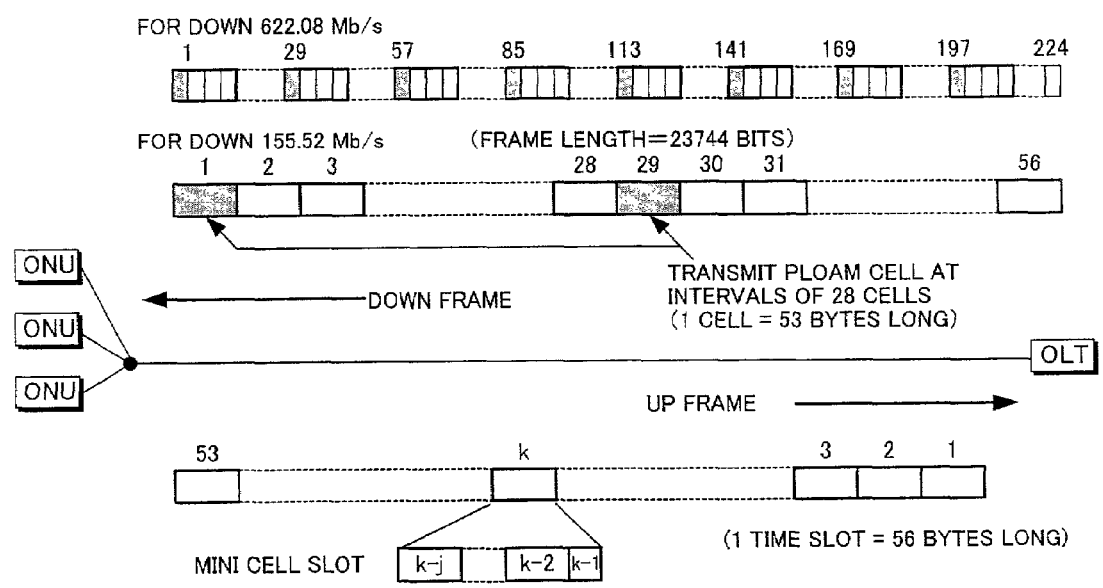
Figure 23:
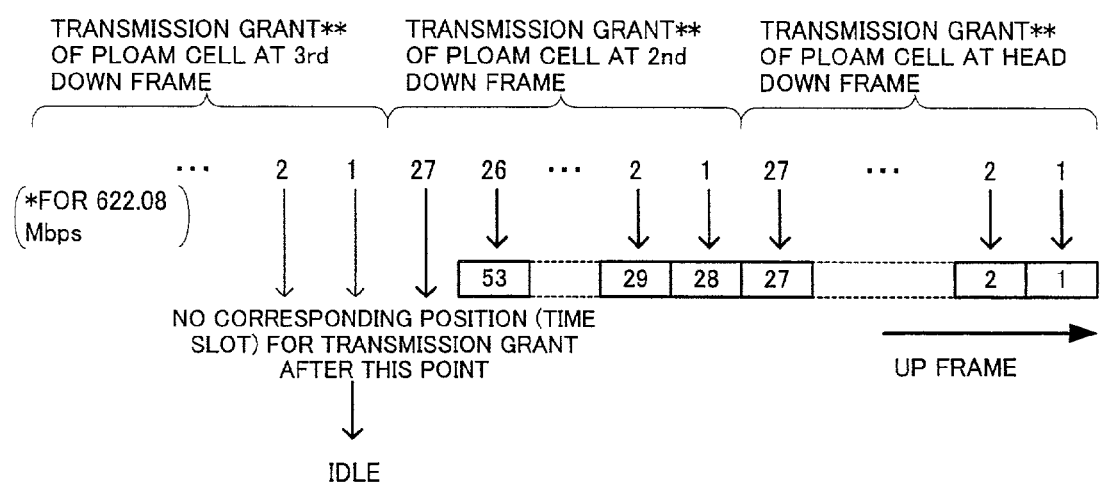
Figure 26:
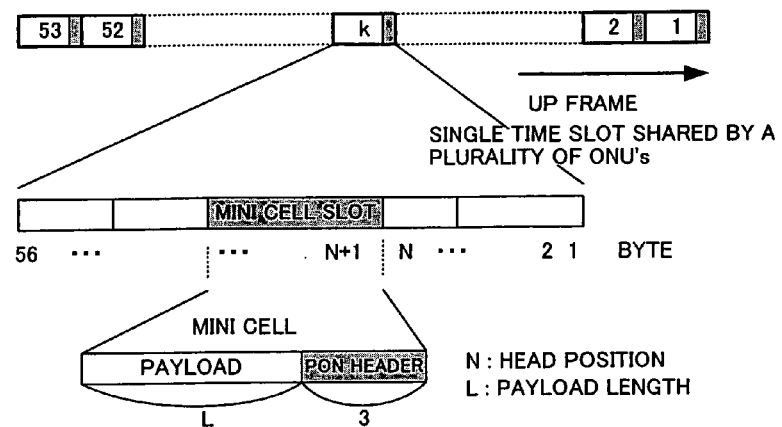
Figure 27:
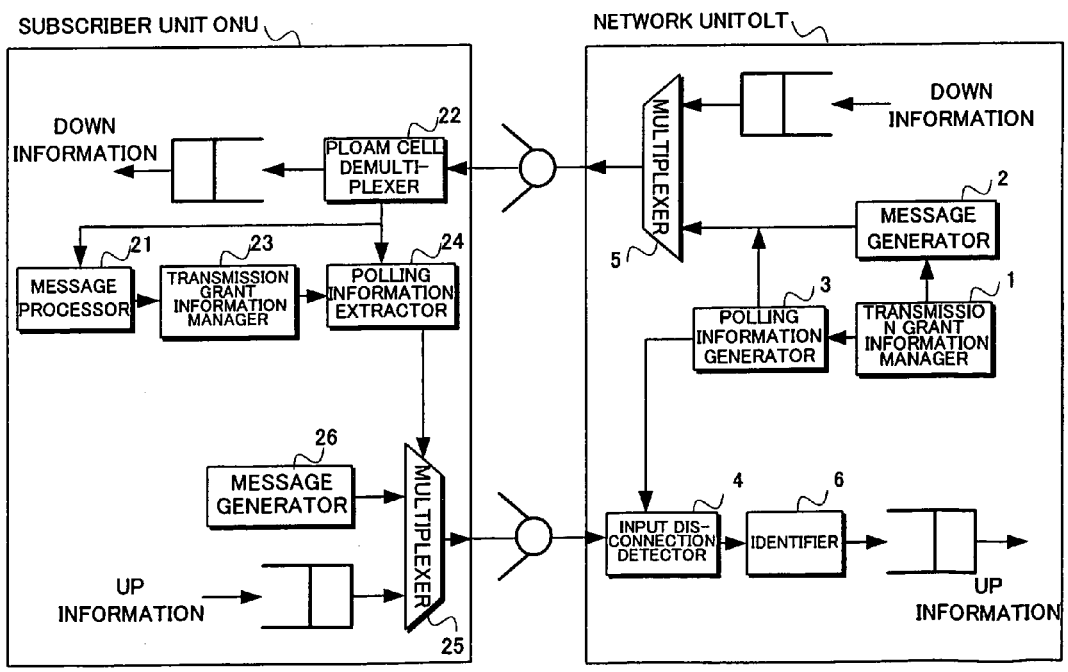

F*ig*. 9 is a block diagram showing an arrangement of an embodiment (5) of a communication system according to the present invention;

F*ig*. 10 is a time chart showing an operation example (input disconnection detection/non-detection timing) of an embodiment (5) of a communication system according to the present invention;

FIG. 11 is a block diagram showing an arrangement of an embodiment (6) of a communication system according to the present invention;

FIG. 12 is a block diagram showing an arrangement of an embodiment (7) of a communication system according to the present invention;

FIG. 13 is a time chart showing an operation example (switchover timing of transmission grant information) of an embodiment (7) of a communication system according to the present invention;

FIG. 14 is a block diagram showing an arrangement of an embodiment (8) of a communication system according to the present invention;

FIG. 15 is a time chart showing an operation example (switchover timing of transmission grant information) of an embodiment (8) of a communication system according to the present invention;

FIG. 16 is a block diagram showing an arrangement of an embodiment (9) of a communication system according to the present invention;

FIG. 17 is a time chart showing an operation example (timing of mini cell setting switchover) of an embodiment (9) of a communication system according to the present invention;

FIG. 18 is a block diagram showing an arrangement of an embodiment (10) of a communication system according to the present invention;

FIG. 19 is a time chart showing an operation example (timing of mini cell setting switchover) of an embodiment (10) of a communication system according to the present invention;

FIG. 20 is a block diagram for illustrating an arrangement of an ATM-PON frame (ITU-TG.983.1);

FIG. 21 is a diagram showing an arrangement of a down physical layer OAM (PLOAM) cell;

FIG. 22 is a diagram showing an arrangement of an up physical layer OAM (PLOAM) cell;

FIG. 23 is a diagram for illustrating a correspondence between regions GRANT1–GRANT27 within a message and up time slots;

FIG. 24 is a diagram showing a PLOAM/data cell transmission grant information allocation (Grant allocation) message;

FIG. 25 is a diagram showing a mini cell transmission grant information setting (Divided slot grant configuration) message;

FIG. 26 is a diagram showing setting items in mini cell transmission grant information (Divided slot grant); and FIG. 27 is a block diagram showing a prior art basic arrangement.

Throughout the figures, like reference numerals indicate like or corresponding components.

DESCRIPTION OF THE EMBODIMENTS

Embodiment (1)

Figure 1:
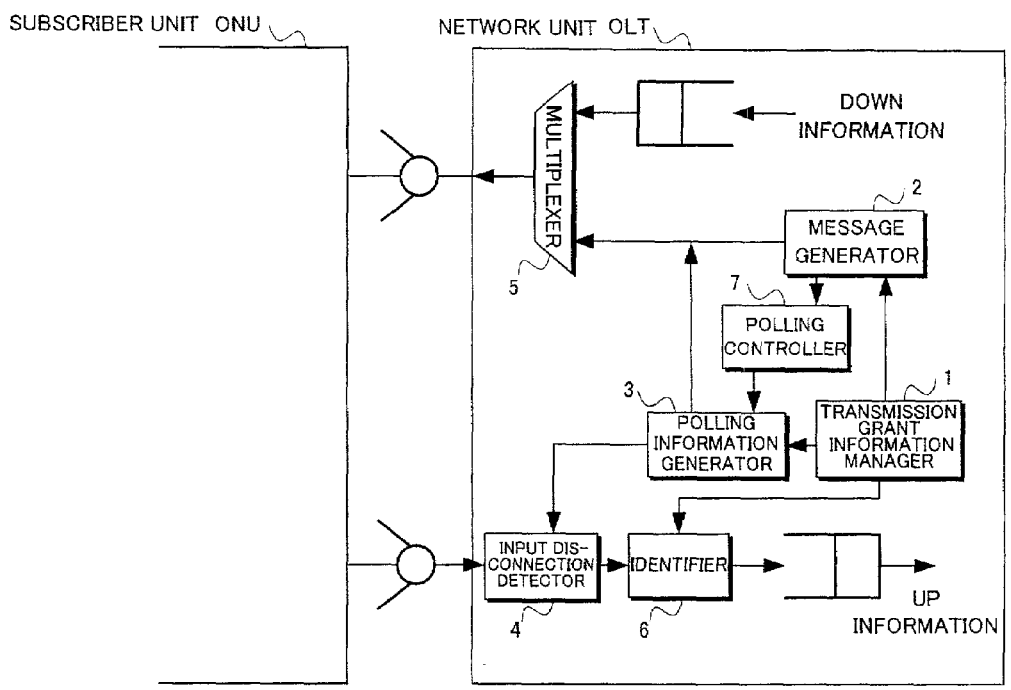
FIG. 1 is a block diagram showing an arrangement of an embodiment (1) of a communication system according to the present invention.

FIG. 1 especially shows an arrangement of a network unit in an embodiment (1) of a communication system according to the present invention. In this embodiment, different from the prior art example shown in FIG. 27, a polling controller 7 is provided between the message generator 2 and the polling information generator 3 to control polling switchover timing. It is to be noted that the arrangement of the subscriber unit ONU is not shown because it is the same as that of the prior art example in FIG. 27, which similarly applies to the following embodiments.

Figure 2:
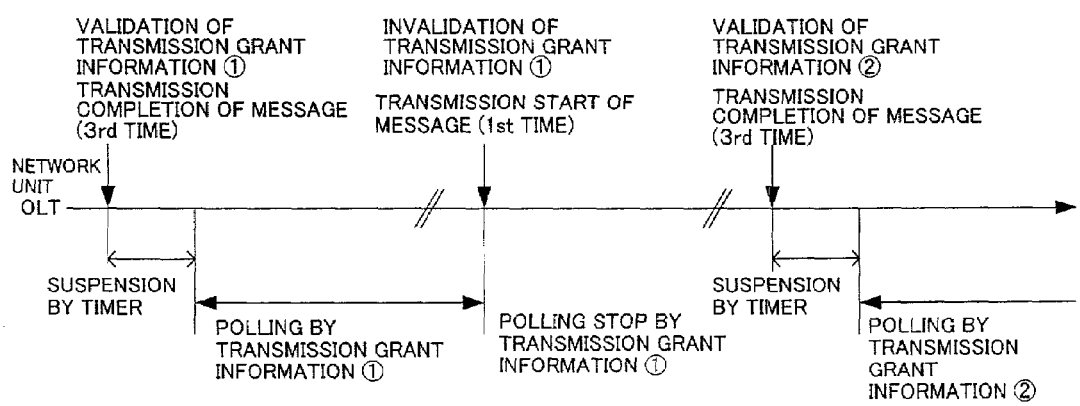
FIG. 2 is a time chart showing an operation example (polling execution timing) of an embodiment (1) of a communication system according to the present invention.

FIG. 2 shows an operation example of a polling control by transmission grant information in this embodiment. When transmission grant information ① is valid, the polling controller 7 suspends (or puts off) for a fixed time in consideration of a processing time of the subscriber unit ONU by using an internal timer (not shown) from the time when the message generator 2 has completely transmitted the message notifying the validity of the transmission grant information ① (from 3rd transmission time in FIG. 2). After this suspension, the network unit instructs the polling information generator 3 to start the polling by the concerned transmission grant information ①.

However, when the transmission grant information ① is invalid, the polling controller 7 instructs the polling information generator 3 to stop the polling by the concerned transmission grant information ① before the transmission of the message notifying the invalidity of the transmission grant information ① or at the transmission start thereof (1st transmission time) of the message.

Thus, this embodiment enables polling at a time when the transmission grant information is valid/invalid to be performed, only when the transmission grant information is valid in the subscriber unit ONU, and enables the input disconnection detection in the subscriber unit to be performed accurately without fault.

Embodiment (2)

Figure 3:
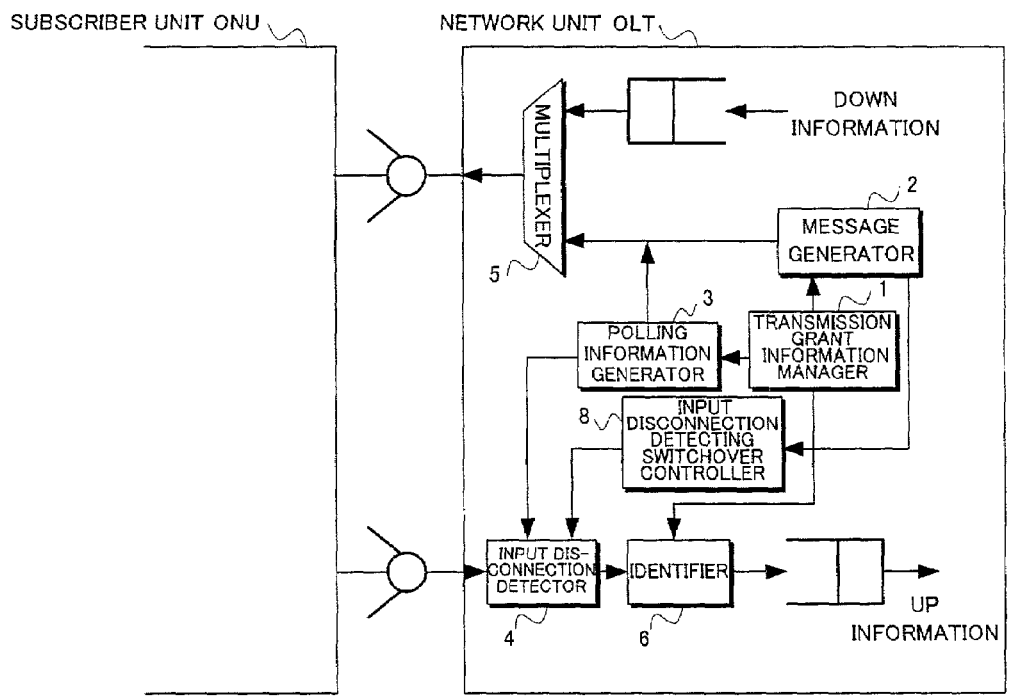
FIG. 3 is a block diagram showing an arrangement of an embodiment (2) of a communication system according to the present invention.

FIG. 3 especially shows an arrangement of a network unit in an embodiment (2) of a communication system according to the present invention. The characteristics of this embodiment is that an input disconnection detecting switchover controller 8 is provided between the message generator 2 and the input disconnection detector 4.

Figure 4:
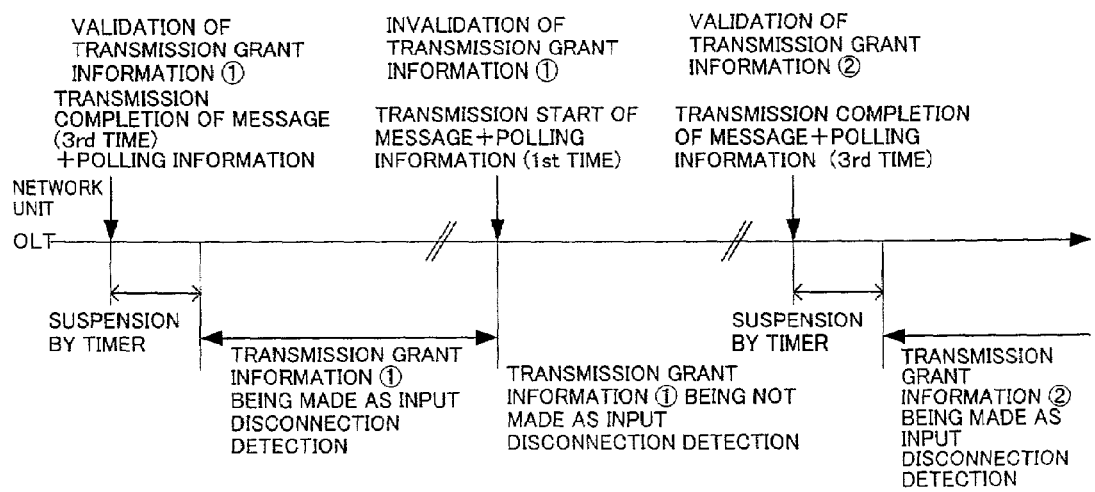
FIG. 4 is a time chart showing an operation example (input disconnection detection/non-detection timing) of an embodiment (2) of the communication system according to the present invention.

FIG. 4 shows an operation example of a control timing of an input disconnection detection for the transmission grant information in this embodiment. When the transmission grant information ① is valid, the input disconnection detecting switchover controller 8 suspends for a time considering the processing time of the subscriber unit ONU by using the timer from the time when the message notifying the validity of the transmission grant information ① and the polling information have been completely transmitted. After a lapse of this suspension time, the input disconnection detecting switchover controller 8 instructs the input disconnection detector 4 to make the concerned transmission grant information ① an object of the input disconnection detection.

On the other hand, when the transmission grant information ① is invalid, the input disconnection detecting switchover controller 8, in the same way as the above-mentioned embodiment (1), instructs the input disconnection detector 4 to make the concerned transmission grant information ① a non-object of the input disconnection detection from the time when the transmission of the message notifying the invalidity of the transmission grant information ① and the polling information has started.

Thus, this embodiment enables the input disconnection detection based on the polling information by the transmission grant information after a lapse of a fixed suspension.

Embodiment (3)

Figure 5:
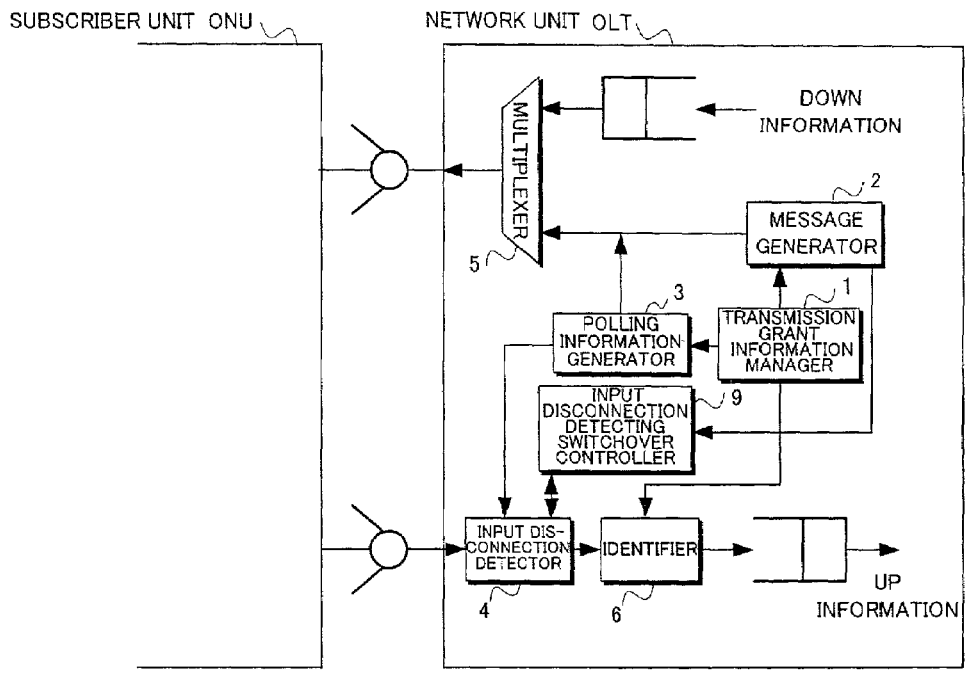
FIG. 5 is a block diagram showing an arrangement of an embodiment (3) of a communication system according to the present invention.

FIG. 5 especially shows an arrangement of a network unit in an embodiment (3) of the communication system according to the present invention. The characteristic of this embodiment is that an input disconnection detecting switchover controller 9 having a different function is substituted for the input disconnection detecting switchover controller 8 in the embodiment (2).

Figure 6:
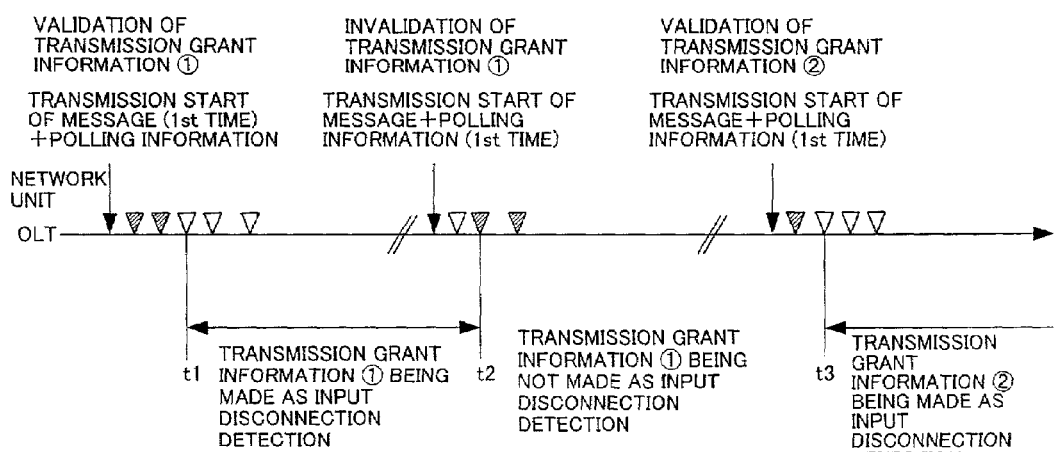
FIG. 6 is a time chart showing an operation example (input disconnection detection/non-detection timing) of an embodiment (3) of a communication system according to the present invention.

FIG. 6 shows an operation example of control timing of the input disconnection detection for transmission grant information in this embodiment. When the transmission grant information ① is valid, the input disconnection detecting switchover controller 9 monitors a detection result of the input disconnection detector 4 from the time when the transmission of the message notifying the validity of the transmission grant information ① and the polling information has started, and then instructs the input disconnection detector 4 to make the concerned transmission grant information ① an object of the input disconnection detection at a time "t1" when a valid input cell for the concerned transmission grant information ① is received.

On the other hand, when the transmission grant information ① is invalid, the input disconnection detecting switchover controller 9 monitors a detection result of the input disconnection detector 4 from the time when the transmission of the message notifying the invalidity of the transmission grant information ① has started, and then instructs the input disconnection detector 4 to make the concerned transmission grant information ① a non-object of the input disconnection detection at a time "t2" when a valid input cell for the concerned transmission grant information ① can not be received.

Embodiment (4)

Figure 7:
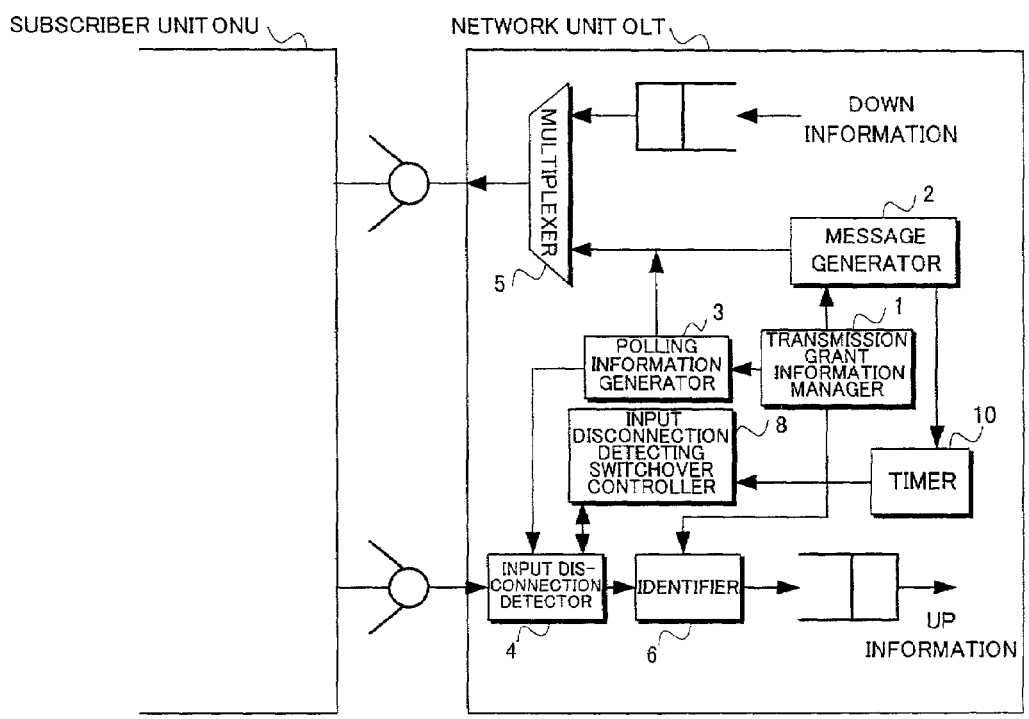

In this embodiment, like the arrangement shown in FIG. 7, a timer 10 may be provided between the message generator 2 and the input disconnection detecting switchover controller 8 (see FIG. 3) in the embodiment (3).

Figure 8A:
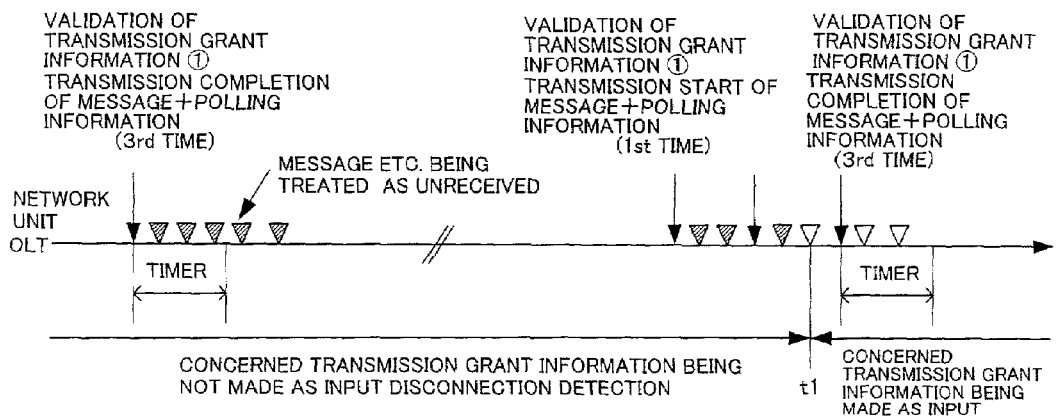
FIGS. 8A and 8B are time charts showing an operation example (input disconnection detection/non-detection timing) of an embodiment (4) of a communication system according to the present invention.

Namely, in the embodiment (4), as shown in the time chart of FIG. 8A, the input disconnection detection result and time after the transmission of the message and the polling information has been completed are monitored after a lapse of a fixed time by the timer 10, thereby enabling the determination as to whether or not the message from the network unit OLT has been processed in the subscriber unit ONU. The switchover of the input disconnection detection object/nonobject at the input disconnection detector 4 may be performed after the suspension by the timer 10 (at a time "t1").

Figure 8B:
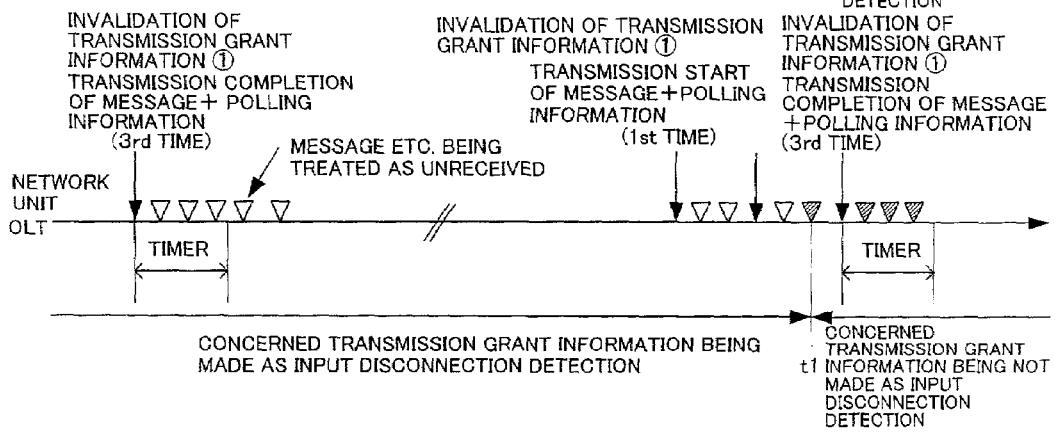

This may be applied to both cases where the transmission grant information ① is valid shown in FIG. 8A and the transmission grant information ① is invalid shown in FIG. 8B.

Embodiment (5)

Figure 9:
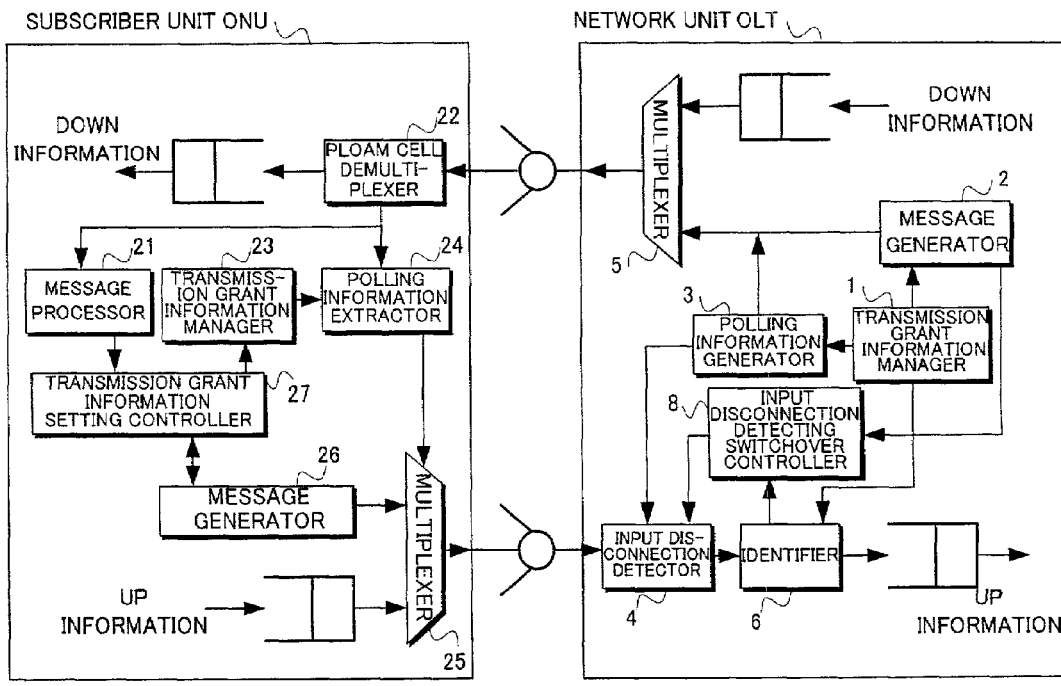

Although this embodiment is not prescribed in the G.983, it can be applied to the case where the subscriber unit notifies the completion of the valid/invalid processing to the network unit by a message. As shown in FIG. 9, the network unit OLT has the same arrangement as that of the embodiment (3) in FIG. 5, while this embodiment is characterized in that a transmission grant information setting controller 27 is newly provided in the subscriber unit ONU of FIG. 27. This transmission grant information setting controller 27 is provided between the message processor 21, the transmission grant information manager 23, and the message generator 26.

Figure 10:
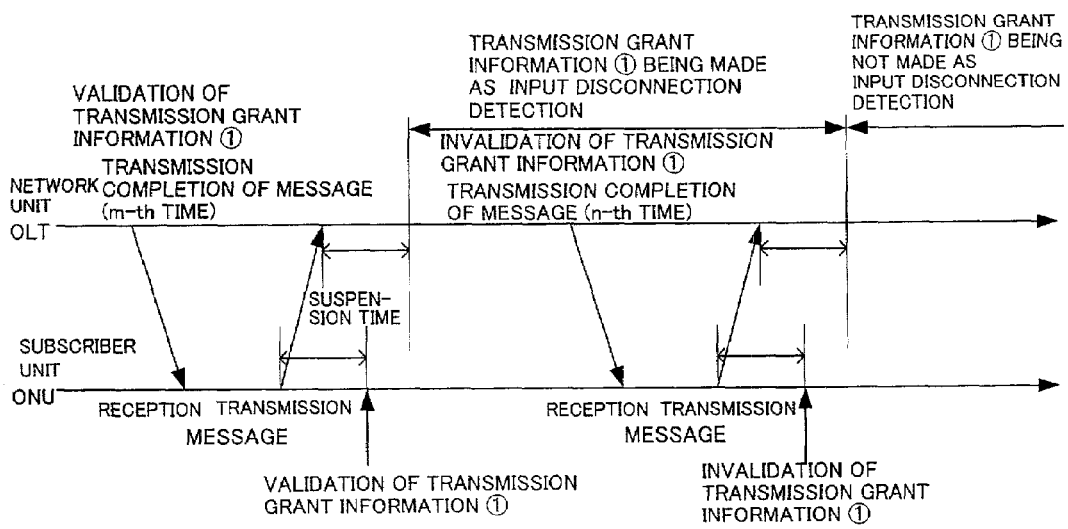

In operation of this embodiment, as shown in the time chart of FIG. 10, the message processor 21 in the subscriber unit ONU receives the message from the network unit OLT to be processed. Then, the message processor 21 recognizes the validity/invalidity of the transmission grant information in the message to be notified to the transmission grant information setting controller 27.

The transmission grant information setting controller 27 instructs the transmission grant information manager 23 to generate the timing for setting the validity/invalidity of the transmission grant information ①. Also, the controller 27 requests the message generator 26 to transmit the message by which the network unit OLT can recognize the above-mentioned timing, and changes the setting of the transmission grant information manager 23 by the generated timing.

In the network unit OLT, the input disconnection detecting switchover controller 8 recognizes the above-mentioned timing when receiving the above-mentioned message from the concerned subscriber unit ONU. When the transmission grant information is valid, the concerned transmission grant information ① is made an object of the input disconnection detection, while the input disconnection detector 4 is controlled to make the transmission grant information ① a non-object of the input disconnection detection when the concerned transmission grant information ① is invalid.

It is to be noted that as shown in FIG. 10, a fixed time form the message transmission to the time when the transmission grant information is validated/invalidated in the subscriber unit ONU, and a fixed time from the message reception to the time when the transmission grant information is made the object/non-object of the input disconnection detection in the network unit OLT may be provided as a suspension time.

Embodiment (6)

FIG. 11 shows an arrangement of this embodiment, in which the transmission grant information manager 1 can allocate two transmission grant information codes per transmission grant information classification in the network unit OLT.

Namely, the transmission grant information manager 1 manages plural transmission grant information per subscriber unit ONUi. The polling information generator (see FIG. 1) generates the polling information per subscriber unit based on the valid transmission grant information at the transmission grant information manager 1.

The transmission grant information manager 1 compares the generated polling information with the set transmission grant information, holds the set transmission grant information in registers 31–36 per classification of the transmission grant information. The transmission grant information manager 1 compares the generated polling information with the set transmission grant information, and the information is notified to the identifier 6 through multiplexers (MUX) 37–39 obtaining a logical sum of the coincident information. The identifier 6 identifies a cell classification per subscriber unit based on this information to be distributed to the processors (not shown) of the cells.

By this embodiment, even when different transmission grant information is valid, it becomes possible to sequentially multiplex the received information with that information per cell classification.

Embodiment (7)

FIG. 12 shows an arrangement of this embodiment, which is characterized in that the network unit OLT in FIG. 27 is provided with a transmission grant information switchover controller 11 between the message generator 2, the input disconnection detector 4, and the identifier 6, and that the subscriber unit ONU in FIG. 27 is provided with a transmission grant information switchover controller 28 between the message processor 21 and the transmission grant information manager 23.

Namely, as shown in the switchover timing operation of the network unit and the subscriber unit in this embodiment of FIG. 13, the transmission grant information manager 1 in the network unit OLT has a function of setting two codes in the same kind of transmission grant information of the subscriber unit ONU, so that e.g. the transmission grant information ① and ② may be allocated to transmission grant information of a certain subscriber unit.

In case the valid transmission grant information of the subscriber unit ONU is switched over from the transmission grant information ① to the transmission grant information ② in the network unit OLT, the switchover controller 11 generates the switchover timing and requests the message generator 2 to transmit a message notifying the switchover timing to the subscriber unit ONU. Based on the time when the message has been completely transmitted, the switchover controller 11 controls the input disconnection detector 4 and the identifier 6 after a fixed suspension time, thereby performing the above-mentioned switchover.

Also, in the subscriber unit ONU, the transmission grant information manager 23 is provided with a function of recognizing two codes of the same kind of transmission grant information, and switches over the transmission grant information after the same fixed suspension time based on the reception time when receiving the above-mentioned message from the network unit OLT. This similarly applies to the switchover from the transmission grant information ② to the transmission grant information ①.

Embodiment (8)

FIG. 14 shows an arrangement of this embodiment, in which a transmission grant information switchover controller 12 of the network unit OLT receives an identification result from the identifier 6, and a transmission grant information switchover controller 29 is mutually connected to the message 25 in the subscriber unit ONU, different from the embodiment (7) in FIG. 12.

Namely, as shown in the operation example of the switchover timing in the network unit and the subscriber unit in this embodiment of FIG. 15, the transmission grant information manager 1 in the network unit OLT allocates two codes to the same kind of transmission grant information of an arbitrary subscriber unit ONU, and makes these e.g. the transmission grant information ① and the transmission grant information ② in the same way as the above.

When the valid transmission grant information is switched over from the transmission grant information ① to the transmission grant information ② in the network unit OLT, the message generator 2 controlled by the switchover controller 12 transmits the message notifying this switchover.

In the subscriber unit ONU, the transmission grant information manager 29 manages two codes of the same kind of transmission grant information, generates the timing of switching over when receiving the above-mentioned message from the network unit OLT, and controls the message generator 25, thereby requesting the transmission of the message notifying this switchover and performing the above-mentioned transmission grant information switchover based on the time of the message transmission.

The network unit OLT switches over the transmission grant information based on the time when receiving the above-mentioned message from the subscriber unit ONU.

It is to be noted that also in this embodiment a fixed suspension time may be provided to both of the network unit OLT and the subscriber unit ONU in the same way as the embodiment (5) of FIG. 10.

Embodiment (9)

FIG. 16 shows an arrangement of this embodiment, which is characterized in that a mini cell setting switchover controller 13 is substituted for the transmission grant information switchover controller 11 of the network unit OLT in the embodiment (7) of FIG. 12, and a mini cell setting switchover controller 30 is substituted for the transmission grant information switchover controller 28 of the subscriber unit ONU.

Namely, as shown in the operation example of a switchover timing in the network unit and the subscriber unit in this embodiment of FIG. 17, two settings may be allocated to the same number on the mini cell transmission grant information by the transmission grant information manager 1 in the network unit OLT, which are supposed to be e.g. settings ① and ②.

In order to switch over the valid setting of the mini cell transmission grant information from the setting ① to the setting ② in the network unit OLT, the mini cell setting switchover controller 13 generates the timing of switching over the setting, controls the message generator 2, and transmits the message to notifying this switchover. Based on the time of the message transmission, the mini cell setting switchover controller 13 switches over the above-mentioned setting at the input disconnection detector 4 and the identifier 6 after a fixed suspension time.

The transmission grant information manager 23 in the subscriber unit ONU has a function of setting two codes in the same kind of transmission grant information. When receiving the above-mentioned message from the network unit OLT, the mini cell setting switchover controller 30 controls the transmission grant information manger 23 based on the reception time, thereby switching over the transmission grant information after the same fixed suspension time.

Embodiment (10)

FIG. 18 shows an arrangement of this embodiment, which is characterized in that mini cell switchover controllers 14 and 31 are substituted for the transmission grant information switchover controllers 12 and 29 in the embodiment (8) of FIG. 14.

Namely, like the operation example of the switchover timing shown in FIG. 19, the network unit and the subscriber unit are provided with such a function that the mini cell switchover controller 31 notifies a switchover timing in the subscriber unit ONU to the network unit OLT by the message through the message generator 26, and that both of the network unit and the subscriber unit switch over at the same time, for a system of allocating different setting contents (payload length, offset value, and service ID) in the mini cell transmission grant information and of switching over the contents in use.

Namely, the mini cell switchover controller 31 of the subscriber unit ONU has a function of setting two codes on the same kind of transmission grant information in the transmission grant information manager 23, and a function of generating a switchover timing to the transmission grant information to be used and of performing a switchover control.

Also, the mini cell switchover controller 14 of the network unit OLT is provided with a function of setting two codes on the same kind of transmission grant information in the transmission grant information manager 1, and a function of switchover control for the transmission grant information according to the timing notified by extracting the message.

Also in this embodiment, in the same way as the embodiment (5) of FIG. 10 and the embodiment (8) of FIG. 15, a suspension time until the switchover may be provided to both of the network unit OLT and the subscriber unit ONU.

As described above, a communication system according to the present invention is arranged such that a plurality of subscriber units are connected to a single network unit through a common medium, and polling is performed by transmission grant information allocated by the network unit. Therefore, the transmission grant information without influencing operations both in the subscriber unit and the network unit can be changed.

What we claim is:

1. A communication system comprising:
    a network unit; and
    a plurality of subscriber units connected to the network unit;
    the network unit having means for generating a message in which validity of transmission grant information is set for the subscriber units, means for generating polling information to allocate a transmission grant to the subscriber units by using the transmission grant information, and means for suspending a transmission of the polling information for a fixed tine in consideration of a processing time of the subscriber units from a time when the message has been completely transmitted.

2. A communication system comprising:
a network unit; and
a plurality of subscriber units connected to the network unit;
the network unit having the means for generating a message in which validity of transmission grant information is set for the subscriber units, means for generating polling information to allocate it transmission grant to the subscriber units by using the transmission grant information, a detecting means for detecting a disconnection state of an inputted cell from the subscriber units, and a controlling means for suspending an operation of the detecting means for detecting the transmission grant information for a fixed time in consideration of a processing time of the subscriber units from a time when the message and the polling information have been completely transmitted.

3. A communication system comprising:
a network unit; and
a plurality of subscriber units connected to the network unit;
the network unit having means for generating a message in which validity of transmission grant information is set for the subscriber units, means for generating polling information to allocate a transmission grant to the subscriber units by using the transmission grant information, a detecting means for detecting a disconnection state of an inputted cell from the subscriber units, and a controlling means for monitoring a detection result of the detecting means from a time when the message and the polling information have been completely transmitted for validating/invalidating a function for the transmission grant information of the detecting means after respectively detecting/not detecting an inputted cell of validity/invalidity for the transmission grant information.

4. The communication system as claimed in claim 3 wherein the network unit is further provided with a timer for respectively validating/invalidating a function of the controlling means according to validity/invalidity of the transmission grant information only after a lapse of a fixed time from a time when the message and the polling information have been completely transmitted.

5. A communication system comprising:
a network unit; and
a plurality of subscriber units connected to the network unit;
the subscriber units having means for recognizing a setting of validity/invalidity of transmission grant information in a message from the network unit, and means for transmitting a message of the network unit when recognizing the setting of the validity/invalidating from the message, and the network unit having means for generating the message, a detecting means for detecting a disconnection state of an inputted cell, and means for validating/invalidating the detecting means when receiving a message from the subscriber units.

6. A communication system comprising:
a network unit; and
a plurality of subscriber units connected to the network unit;
the network unit having means for managing plural kinds of transmission grant information, means for detecting transmission grant information coincident with the transmission grant information set from polling information of a same subscriber unit received by the polling, and means for identifying a kind of transmission grant information based on the detected transmission grant information and for distributing an inputted cells.

7. A communication system comprising: a network unit; and
a plurality of subscriber units connected to the network unit;
the network unit having means for managing plural kinds of transmission grant information set in a message, means for notifying a switchover of validity/invalidity transmission grant information to the subscriber units by a message, and means for executing the switchover of the transmission grant information within the network unit itself after a fixed time in consideration of a processing time of the subscriber units from a time of the notification, and
the subscriber units having means for executing the switchover of the transmission grant information within the subscriber units themselves after the fixed time from a reception of the message.

8. A communication system comprising:
a plurality of subscriber units connected to the network unit;
the subscriber units having means for executing the switchover of the validity/invalidity of plural kinds of transmission grant information set in a message, and means for transmitting a message to the network unit when the recognizing switchover by message from the network unit, and
the network unit having a detecting means for detecting a disconnection state of the inutted cell, and means for executing the switchover of the transmission grant information within the network unit itself when receiving a message from the subscriber units and for validating/invalidating the detecting means.

9. A communication system comprising:
a network unit; and
a plurality of subscriber units connected to the network unit;
the network unit having means for managing plural kinds of mini cell transmission grant information set in a message, means for notifying a switchover of the Validity/invalidity of the mini cell transmission grant information to the subscriber units by the message, and means for executing the switchover of the validity/invalidity of the mini cell transmission grant information within the network unit itself after a fixed time in consideration of the processing time of the subscriber units form a time of the notification, and the subscriber units having means for executing the switchover of the mini cell transmission grant information within the subscriber units themselves after the fixed time from a reception of the message.

10. A communication system comprising:
a network unit; and
a plurality of subscriber units connected to the network unit;
the subscriber units having means for recognizing plural settings of mini cell transmission grant information set in a message, and means for transmitting a message to the network unit when recognizing a switchover of the setting by a message from the network unit, and
the network unit having a detecting means for detecting a disconnection state of an inputted cell, and means for executing the switchover of the setting of the mini cell transmission grant information within the network unit itself when receiving a message from the subscriber units and for validating/invalidating the detecting means.

11. The communication system as claimed in claim 1 wherein the transmission grant information includes physical layer OAM cell transmission grant information and data cell transmission grant information.

12. The communication system as claimed in claim 2 wherein the transmission grant information includes physical layer OAM cell transmission grant information and data cell transmission grant information.

13. The communication system as claimed in claim 3 wherein the transmission grant information includes physical layer OAM cell transmission grant information and data cell transmission grant information.

14. The communication system as claimed in claim 4 wherein the transmission grant information includes physical layer OAM cell transmission grant information and data cell transmission grant information.

15. The communication system as claimed in claim 5 wherein the transmission grant information includes physical layer OAM cell transmission grant information and data cell transmission grant information.

16. The communication system as claimed in claim 4 wherein the transmission grant information includes physical layer OAM cell transmission grant information and data cell transmission grant information.

17. The communication system as claimed in claim 7 wherein the transmission grant information includes physical layer OAM cell transmission grant information and data cell transmission grant information.

18. The communication system as claimed in claim 8 wherein the transmission grant information includes physical layer OAM cell transmission grant information and data cell transmission grant information.

* * * * *